United States Patent [19]

Narumiya et al.

[11] Patent Number: 4,740,406

[45] Date of Patent: Apr. 26, 1988

[54] POROUS CERAMIC STRUCTURE

[75] Inventors: Tsuneaki Narumiya; Hirotsugu Masuda; Eigo Tanuma; Munehiko Kato, all of Yokohama, Japan

[73] Assignee: Bridgestone Corporation, Tokyo, Japan

[21] Appl. No.: 836,342

[22] Filed: Mar. 5, 1986

[30] Foreign Application Priority Data

Mar. 5, 1985 [JP] Japan .............................. 60-31371[U]

[51] Int. Cl.$^4$ ........................... B32B 3/12; F27D 1/00
[52] U.S. Cl. ....................................... 428/73; 52/746; 110/336; 156/89; 428/116
[58] Field of Search ........................ 428/73, 116, 117; 55/523; 156/89; 422/180; 502/527; 110/336; 427/234; 52/746

[56] References Cited

U.S. PATENT DOCUMENTS

| | | | |
|---|---|---|---|
| 2,977,265 | 3/1961 | Forsberg et al. | 428/116 |
| 3,086,624 | 4/1963 | Wyatt | 428/116 X |
| 3,481,427 | 12/1969 | Dobbs et al. | 428/116 X |
| 3,755,204 | 8/1973 | Sergeys | 428/116 X |
| 3,899,326 | 8/1975 | Frost et al. | 428/116 X |
| 3,903,341 | 9/1975 | Gerhold | 428/118 X |
| 4,061,812 | 12/1977 | Gilwee, Jr. et al. | 427/117 |
| 4,135,018 | 1/1979 | Bonin et al. | 428/116 |
| 4,329,162 | 5/1982 | Pitcher, Jr. | 428/188 X |
| 4,404,007 | 9/1983 | Tukao et al. | 428/117 X |

Primary Examiner—Henry F. Epstein
Attorney, Agent, or Firm—Birch, Stewart, Kolasch & Birch

[57] ABSTRACT

Described herein is a porous ceramic structure consisting of a ceramic roll core or an assembly of ceramic roll cores each comprising: consecutively aligned pairs of inclined cylindrical cell units of oblique figure "8" shape, each cylindrical cell unit having a width of 5-30 mm, a height of 10-100 mm and an angle of inclination of 20-70 degrees.

20 Claims, 4 Drawing Sheets

POROUS CERAMIC STRUCTURE

BACKGROUND OF THE INVENTION

1. Field of the Invention

This invention relates to a porous ceramic structure, which is suitable for use as a gas permeable heat insulator to be fitted in an exhaust port of a furnace or the like for the purpose of enhancing the heat efficiency of the furnace.

2. Description of the Prior Art

It has been known in the art to thermally insulate an exhaust port of a furnace or the like by means of a gas permeable heat insulator such as a fine ceramic honeycomb or a porous ceramic body having three-dimensional interconnected open cells, thereby shielding the furnace from radiation cooling and collecting the heat energy of exhaust gases by heat exchange as the gases pass through the gas permeable heat insulator. The collected heat energy is recycled directly by radiating the same toward the heating side as radiation heat (Japanese Patent Application Laid-Open No. 57-209892).

The conventional gas permeable heat insulators, including the above-mentioned ceramic honeycomb and porous ceramic body having three-dimensional interconnected open cells, exhibit excellent properties as long as they are used under conditions free of large temperature variations and dust. However, the ceramic honeycomb is liable to cracks or similar damages in the corner or edge portions when used under conditions with great changes in temperature. On the other hand, the porous ceramic body with its three-dimensional interconnected open cells is easily blocked when a large amount of dust (e.g., ashes generated in a combustion system or scales from heated material) is present in exhaust gases, resulting in an increase in pressure loss which is inviting trouble to the operation of the furnace.

SUMMARY OF THE INVENTION

It is therefore an object of the present invention to provide a porous ceramic structure which can be suitably used as a gas permeable heat insulator which is almost free of blocking of pores and cracks or similar damages even when used for exhaust gases containing a large amount of dust and/or under largely varying temperature conditions.

Since the porous ceramic structure according to the present invention is unsusceptible to clogging and cracks even under severe conditions involving great changes in temperature as mentioned above, it is also suitable for use under high temperatures, for example, as an exhaust gas cleaner, a particulate collector, a molten metal filter and the like.

In accordance with the present invention, the above-mentioned object is achieved by the provision of a porous ceramic structure which is constituted by a ceramic roll core or an assembly of such ceramic roll cores each alternately folded into the shape of an oblique figure "8" to form consecutively aligned pairs of inclined cylindrical cell units, each one of the cylindrical cell units having a width of 5–30 mm, a height of 10–100 mm and an angle of inclination of 20–70 degrees.

In this instance, according to the condition of use, for example, the area which needs heat insulation, a suitable number of the ceramic roll cores are joined to each other at the respective longitudinal sides to form a ceramic roll core assembly of a size corresponding to that area.

The porous ceramic structure according to the present invention can be suitably used as a gas permeable heat insulator to be fitted in an exhaust gas outlet of a furnace. In such a case, the cylindrical inclined cell units in the roll core or an assembly of roll cores form gas passages. Therefore, by fitting the ceramic structure of the invention in such a manner as to cover the entire area of an exhaust gas outlet of a furnace and to block straight passage of light through the inclined cylindrical cell units (i.e., the gas passages), it becomes possible to prevent radiation cooling of the furnace, reflecting back the radiation heat to the furnace by the heat insulator. Besides, heat exchange takes place between the exhaust gas and heat insulator as the former passes through the exhaust gas passages (inclined cylindrical cell units) in the heat insulator, and the collected heat is radiated to the heating side as radiation heat, achieving considerable energy saving effectively by directly recycling the exhaust heat. Since the exhaust gas is discharged through the inclined cylindrical cell units, there is no possibility of giving adverse effects on combustion even when the heat insulator is applied to a combustion furnace. Especially, the porous ceramic structure with the above-described construction according to the invention possesses high resistance to thermal impact since it can disperse the thermal stress which is imposed as a result of a large temperature variation, and is less susceptible to clogging with dust. Accordingly, it can be suitably used for an exhaust gas with a large content of dust or in a place which is subject to large temperature variations.

Thus, the porous ceramic structure according to the invention possesses practically valuable properties as a gas permeable heat insulator, in view of its unsusceptibility to clogging and high resistance to thermal impact almost free of cracks or damages as caused by thermal stress even when it is used for an exhaust gas containing a large amount of dust under conditions involving large temperature variations.

According to a preferred embodiment of the present invention, the walls which constitute the respective cylindrical cell units of the ceramic roll core are provided with openings which intercommunicate the adjacent cylindrical cell units, thereby forming intermingling flow passages in the roll core to ensure high stirring effect on the fluid which flows through the roll core or core assembly.

The above-mentioned roll core or roll core assembly may be used in a stacked form containing, in multiple layers, two or more than two roll cores or roll core assemblies, and may be provided with a porous ceramic body such as ceramic foam or ceramic noodle at one or both ends of the roll core or roll core assembly.

Further, according to the invention, a hollow cavity which is closed at one axial end is formed in the walls of the respective cylindrical cell units to prevent damages which would otherwise be caused by thermal stress as a result of temperature differences across the roll core body.

BRIEF DESCRIPTION OF THE DRAWINGS

The above and other objects, features and advantages of the invention will become more apparent from the following description and claims taken in connection with the accompanying drawings, in which:

DESCRIPTION OF PREFERRED EMBODIMENTS

Figure 1:
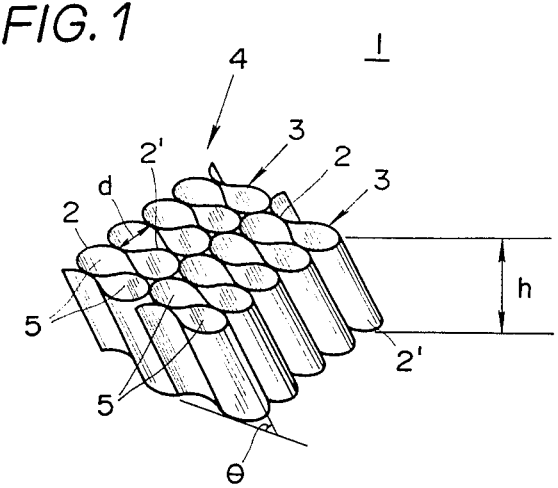
FIG. 1 is a partly cutaway perspective view of an embodiment of the invention.
Figure 2:
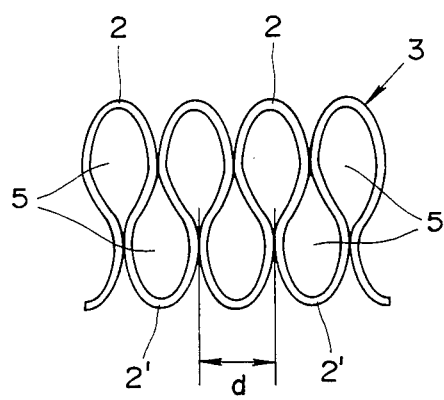
FIG. 2 is a partly cutaway plan view on an enlarged scale of the same embodiment.

Referring to FIG. 1, there is shown a porous ceramic structure 1 according to the invention, which is constituted by a roll core 3 or an assembly of such roll cores each alternately folded into the shape of oblique figure "8" to form consecutively aligned pairs of inclined cylindrical cell units 2 and 2' of oval shape in section. In the particular example shown in FIG. 1, the porous ceramic structure 1 consists of an assembly 4 of a number of juxtaposed roll cores 3 (two roll cores 3 in FIG. 1) which are joined to each other at the opposing folded sides in the manner shown. In this instance, the walls which form the cylindrical cell units 2 and 2' are continuously connected with each other, and the hollow cylindrical cell units 2 and 2' provide passages 5 for a fluid such as exhaust gas or the like.

The contiguity in the longitudinal direction of the roll core 3 (the length of the rows of the inclined cylindrical cell units 2 and 2') and the number of the roll core bodies 3 are determined selectively depending upon the dimensions of a place in which the ceramic structure 1 is to be fitted. It is also to be noted that the cylindrical cell units 2 and 2' are not limited to the oval shape shown, and may be formed in circular or other suitable shapes.

According to the present invention, the cylindrical cell units 2 and 2' which constitute a roll core are arranged to have a width (d) of 5–30 mm (the diameter of the shorter side in the case of the cylindrical cell units with an oval sectional shape as shown in FIG. 1), a height (h) of 10–100 mm (the thickness of the roll core) and an angle of inclination ($\theta$) of 20–70 degrees. By so doing, the pressure loss as well as impedement of combustion which would be invited by blockade of cell units by accumulation of dust in the exhaust gas can be suitably suppressed when the structure 1 is used as a gas permeable heat insulator, while effectively shielding radiation cooling and ensuring high resistance to thermal impact and strength. On the other hand, if the above-mentioned width (d) is smaller than 5 mm, the gas passages 4 (the cylindrical cell units) are likely to be blocked by accumulation of dust in exhaust gas, in addition to an increase of pressure loss which reaches an unacceptable large value during operation of a relatively short time period. On the contrary, if the width is greater than 30 mm, the porosity becomes too large and the surface areas of the ceramic walls which exchange heat with the exhaust gas become relatively small, lowering the heat transfer from the exhaust gas to the heat insulator and increasing the radiation cooling to a considerable degree which is unsuitable as a gas permeable heat insulator. Further, if the height (h) of the cylindrical cell units 2 and 2' (or the thickness of the roll core) is smaller than 10 mm, the heat transfer from the exhaust gas to the heat insulator is lowered by reduction of the surfaces areas of the ceramic walls, and the optical thickness of the roll core 3 becomes too small to block straight passage of light through the heat insulator, resulting in unsatisfactorily increased radiation cooling. In case the angle of inclination of the cylindrical cell units 2 and 2' is smaller than 20 degrees, it becomes difficult to secure a sufficient effect of suppressing radiation cooling, and, in order to suppress the radiation cooling to a sufficient degree, the cylindrical cell units (or the thickness of the roll core) are required to have a great height, in addition to an increased pressure loss due to dust accumulation which is more likely to occur, thus failing to achieve the object of the present invention. On the other hand, an angle of inclination greater than 70 degrees would result in a large pressure loss and, in case the end faces of the respective cell units are faced toward the exhaust gas in great dust accumulation, which is unacceptable as a practical gas permeable heat insulator.

Preferred ranges of the above-mentioned width (d), height (h) and angle of inclination ($\theta$) are 7–18 mm, 15–30 mm and 30–65 degrees, respectively. Besides, the ceramic roll core according to the invention is preferred to hold the pressure loss of air to 0.05–10 mm, more preferably to 0.1–1 mm, in passing through a thickness of 1 cm at a velocity of 1 m per second.

The ceramic roll core of the invention can be manufactured by drying and sintering ceramic slurry which is deposited on a substrate roll core or an assembly of a number of bonded substrate roll cores, which is in turn formed by alternately folding an elongated strip of paper or plastic sheet in such a manner as to form a figure "8" consecutively in an oblique fashion and cutting the opposite ends of the cylindrical cell units obliquely. In this instance, the ceramic material is not limited to particular kinds, but it is preferred to use cordierite, mullite, alumina, silicon carbide or the like from a standpoint of resistance to thermal impact.

The porous ceramic structure of the invention can be used as a gas permeable heat insulator by fitting same in an exhaust gas outlet or passage of a furnace which is heated by combustion of a fuel such as gas, petroleum or the like. For example, it is installed in such a manner as to cover an exhaust gas outlet or passage or a material to be heated. By so doing, the material is heated by radiation heat of the furnace as well as the radiation heat reflected by the gas permeable heat insulator and the radiation heat from the heat insulator itself resulting from heat exchange with the hot exhaust gas which flows through the heat insulator. Accordingly, an extremely high heating efficiency can be attained by the use of the waste heat which has not thus far been utilized for heating the material in the furnace. In addition, the porous ceramic structure of the invention employing a ceramic roll core or cores having consecutively a large number of inclined cylindrical cell unit pairs of an oblique "8" figure shape, with specific width, height and angle of inclination, has an effect of dispersing thermal stress suitably to guarantee high resistance to thermal impact, and is less susceptible to accumulation and blockade by dust in exhaust gases, which would hinder combustion in a furnace.

In the above-described case, the ceramic structure of the invention may be mounted arbitrarily, but it is advisable to dispose its end face straight toward exhaust gas flows or at a similar angle and to cover an exhaust gas duct of a furnace without permitting light to pass straight through the heat insulator (so that the exhaust gas will hit on the walls of the heat insulator), for suppressing radiation cooling and ensuring the effect of reducing dust accumulation all the more.

If necessary, the roll core or roll core assembly may be imparted with a catalytic action for removing NOx which occurs, for example, in a furnace with a heavy oil burner.

Figure 3:
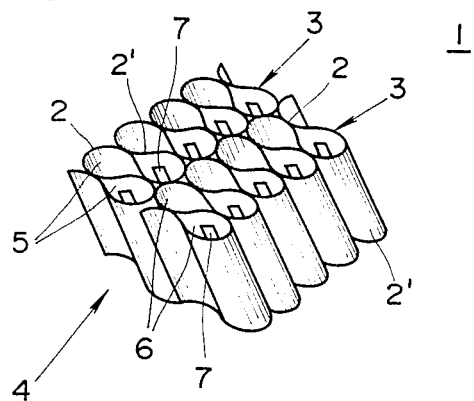
FIG. 3 is a view similar to FIG. 1 but showing another embodiment of the invention.
Figure 4:
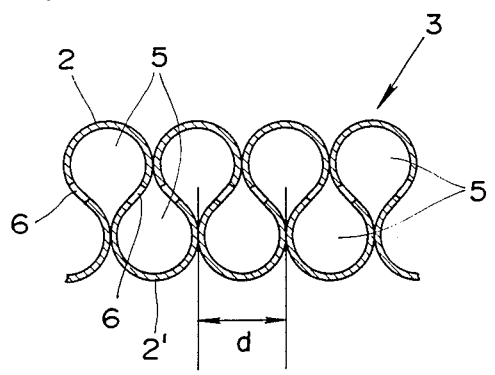
FIG. 4 is a cross section of the embodiment of FIG. 3.
Figure 5:
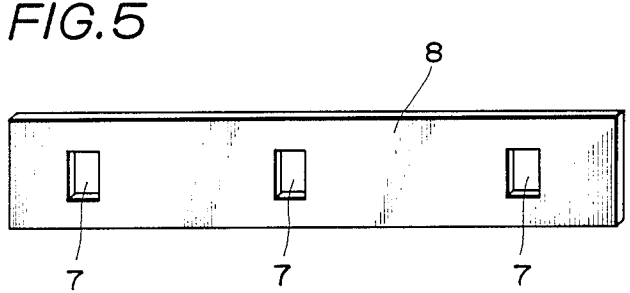
FIG. 5 is a partly cutaway perspective view of a sheet or web to be used for production of the roll core of FIG. 3.

Illustrated in FIG. 3 is another embodiment of the invention, in which a ceramic roll core 3 is provided with a series of paired cylindrical cell units 2 and 2' of an oblique figure "8" shape with a circular or oval shape in section similarly to the embodiment of FIG. 1, FIG. 3 shows a honeycomb-like roll core assembly 4 in which a couple of juxtaposed roll cores 3 are joined to each other at the opposing folded sides. The cylindrical cell units 2 and 2' are formed with square openings 6 in the respective cell walls to intercommunicate the hollow spaces 5 of the adjacent cell units 2 and 2'. In the embodiment shown in FIG. 3, the hollow spaces 5 of the cylindrical cell units 2 and 2' in one roll core 3 are communicated with each other through the openings 6, but not with the hollow spaces of the cylindrical cell units in the other roll core 3. However, there may of course be provided openings which intercommunicate the hollow spaces 5 of the cylindrical cell units in one roll core 3 with the cell units in the other roll core 3.

In this instance, the size of the openings 6 is desired to be 20–95%, preferably 20–50% of the surface area of the cylindrical cell walls. One or a plural number of such intercommunicating openings are formed in the longitudinal direction of the respective cell walls. The shape of the openings 6 is not limited to the particular example shown, and they may be formed in any other arbitrary shape instead of the square shape shown.

Although the present invention imposes no restriction on the method of manufacturing the above-described ceramic roll core 3 or roll core assembly 4, it is advisable to dry and sinter ceramic slurry which is deposited on a roll core or an assembly of a number of bonded roll cores each formed from an elongated strip of paper or plastic film with square openings 7 at predetermined intervals along the length thereof and alternately folded in such a manner as to form consecutively an oblique figure "8" as described hereinbefore.

In this embodiment, the roll core or roll core assembly internally defines linear flow passages by the cylindrical cell units. However, since openings are formed in the cell walls, part of the fluid which flows through the cylindrical cell units is diverted at right angles with the linear flow passages (the hollow spaces in the cylindrical cell units), forming intermingling flows through the roll core under the influence of excellent stirring actions resulting from the provision of the openings. Therefore, when employed as a molten metal filter or a particulate collector, the porous ceramic structure of the invention can reliably remove entrained impurities by the internal filtering effect in addition to its surface filtering effect. When used as a gas permeable heat insulator, a fluid is efficiently brought into contact with the cylindrical cell walls to exchange heat therewith in a secure manner.

Figure 6:
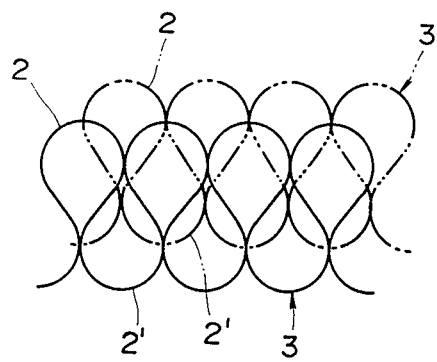
FIG. 6 is a diagrammatic view of still another embodiment of the invention.

The roll core or roll core assembly according to the invention can be used in a stacked form as exemplified by the embodiment of FIG. 6. In this instance, a plural number of roll core assemblies 4 of FIG. 1 (two roll core assemblies 4 in this case) are superposed one on the other suitably in a staggered fashion, namely, with the lower open ends of the cylindrical cell units 2 and 2' of an upper roll core 3 superposed on the upper open ends of cylindrical cell units 2 and 2' of a lower roll core 3 in shifted positions relative to the latter. In this instance, the upper roll core 3 (indicated by solid line) may be staggered relative to the lower roll core 3 (indicated by two-dot chain line) in both the longitudinal and transverse directions as shown particularly in FIG. 6, or only in the longitudinal or transverse direction. Any case, the shifted roll core positioning shown in FIG. 6 is most preferable. With regard to the extent of the shift, it is preferable that the cylindrical cell walls of the lower roll core 3 are located in positions at $\frac{1}{3}$–$\frac{2}{3}$ of the longitudinal or transverse width of the cylindrical cell units 2 and 2' of the upper roll core 3. The number of the overlapping roll cores 3 is determined depending upon the breadth of the space in which the roll core assembly is to be mounted, or other conditions.

The overlapped roll core assembly can be manufactured for example, by drying and sintering a ceramic slurry deposited on a roll core assembly consisting of a plural number of the afore-mentioned paper roll cores which are joined at longitudinal sides and superposed on similarly joined roll cores in staggered relation therewith. If necessary, the staggeredly superposed roll core assemblies may be joined integrally to each other. When mounting on a tundish or the like, a suitable number of assemblies 4 may be fitted in shifted positions. However, in case the integrally joined assembly is used as a molten metal filter, desirably its total height should not exceed 100 mm since otherwise the thermal stress could be increased due to the temperature difference between the upper and lower end portions (the inlet and outlet ends) of the cylindrical cell units or the roll cores, as a result inviting fracturing of the roll cores.

Figure 7:
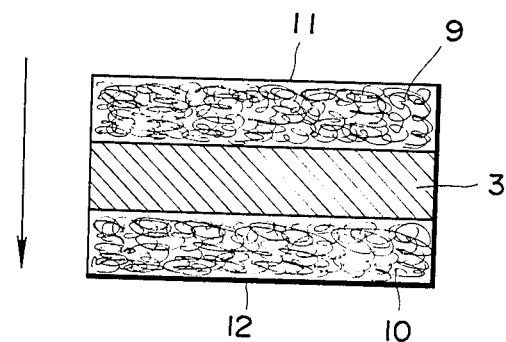
FIG. 7 is a diagrammatic side view of a further embodiment of the invention.

Referring now to FIG. 7, there is illustrated still another embodiment of the porous ceramic structure according to the invention, in which the above-described roll core 3 or a roll core assembly 4 is sandwiched between rectangular plate-like porous ceramic bodies 9 and 10 of three-dimensional lattice structure in which a fluid is repeatedly hit against the lattices as it flows therethrough. With this porous ceramic structure, a fluid flows in through an exposed surface 11 of a first porous ceramic body 9 on the upstream side and, after passing through the first porous ceramic body 9 and a second or intermediate layer of a roll core 3, flows out from an exposed surface 12 of a third porous ceramic body 10 in the direction indicated by an arrow.

For the first and third porous ceramic bodies, it is possible to use ceramic foam which internally has three-dimensionally interconnected open cells. In this instance, the ceramic foam is preferred to have a specific bulk density of 0.25–0.7, interconnecting spaces of 0.2–10 mm in average diameter, a porosity of 75–95%, and an air pressure loss of 0.1–40 mm in water column for passing through a thickness of 1 cm at a velocity of 1 m per second. More preferably, there should be employed ceramic foam with interconnecting spaces of 1–10 mm in average diameter for the purpose reducing the pressure loss.

For producing such ceramic foam, it is desirable to deposit ceramic slurry on reticulate flexible polyurethane foam which has no cell membranes, followed by sintering to remove the polyurethane form by carbonization. The ceramic foam which is formed in this manner from the cell membrane-free reticulate flexible polyurethane foam presents a cage-like structure consisting of only ridge portions of regular dedecahedrons with a porosity which is high enough to reduce the pressure loss, and complicately interconnected internal void spaces to ensure secure contact of the passing fluid with the lattices to produce the above mentioned effects.

Alternatively, the porous ceramic body for the first and third layers may be the so-called ceramic needle which is obtained by extruding the ceramic slurry into a needle form, overlapping the resulting needles into a porous structure in such a manner as to block straight passage of light therethrough, and sintering the porous structure. In accordance with the present invention, the porous ceramic body such as ceramic foam or ceramic needles which refuse straight passage of light is employed for the first and third layers to obtain a porous ceramic structure which is satisfactory in the effect of shielding the radiation cooling. The ceramic needle is preferred to have properties similar to the above-mentioned ceramic foam with regard to the specific bulk density, average diameter of the internal interconnecting void spaces, porosity and the air pressure loss.

Further, according to the present invention, instead of employing ceramic foam or ceramic needles for the first and third layers, it is possible to use ceramic foam for the first layer and ceramic needles for the third layer or vice versa.

In the present invention, the porous ceramic body of the first layer on the upstream side preferably is smaller than 30 mm in thickness, more preferably smaller than 10 mm since otherwise it would be fractured by thermal stress. In a case where thermal stress is likely to occur due to a large temperature difference across the first porous ceramic body on the upstream side or between the first porous ceramic body and the roll core of the intermediate layer, slits may be formed in the first porous ceramic body for the purpose of lessening the thermal stress.

The third porous ceramic body on the downstream side is conspicuously low in temperature as compared with the first layer on the upstream side due to the blockade of radiation heat by and the heat exchange of the fluid in the first porous ceramic body, and barely susceptible to fracturing by thermal stress since the temperature difference between its front and rear sides is small. Therefore, the third layer is preferred to have a thickness greater than 10 mm to enhance its heat-resisting creep property.

The porous ceramic structure with the above-described triple-layer construction utilizes the different thermal actions by the respective layers thereby relieving the thermal stress to ensure higher resistance to thermal stress. The thermal stress which occurs in first layer on the upstream side is relieved by the second (intermediate) layer which has low resistance to air flow and high heat-resisting creep property, preventing the thermal stress from being transmitted directly from the first layer to the third layer on the downstream side.

Figure 8:
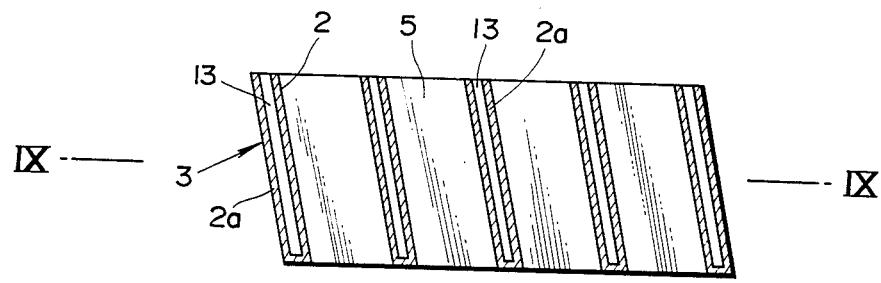
FIG. 8 is a diagrammatic longitudinal section of a further embodiment of the invention.

Illustrated in FIG. 8 is a further embodiment of the invention, wherein a roll core 3 which is constituted consecutively of pairs of inclined cylindrical cell units 2 of oblique figure "8" shape is provided with cavities 13 in the walls 2a of the respective cylindrical cell units 2, each cavity 13 being opened at one axial end.

In this instance, the cavities 13 are formed in and along the circumferences of the walls 2a of the respective cylindrical cell units 2 in communication with cavities of adjacent cell units 2. Further, as shown in FIG. 8, the cavities 13 are formed continuously in the axial direction from one end face of a cell wall 2a to a point close to the other end face. Accordingly, the walls 2a of the cylindrical cell units 2 are bisected widthwise as shown in the drawing, the bisected wall portions being connected at one end and separated in free state at the other end so that the cell walls are movable more easily in the widthwise direction at the freely separated ends to accommodate thermal deformation in a greater degree.

Since the above-described roll core 3 is provided with cavities 13 in the walls 2a of the cylindrical cell units 2 in such a manner as to bisect the cylindrical cell walls 2, the cavities 13 being opened to the outside at one axial end as described hereinbefore, so that the bisected wall portions at the open end are disposed free of each other and readily movable in the widthwise direction to adapt thermal deformations. Consequently, even when the roll core 3 is subjected to a considerable thermal impact as a result of a large temperature difference due to a temperature rise or drop, the thermal stress is dispersed in an extremely favorable fashion to prevent the roll core 3 from being easily fractured by thermal impact.

Figure 9:
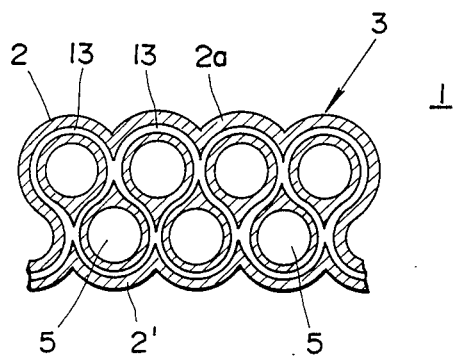
FIG. 9 is a sectional view taken on line IX—IX of FIG. 8.

With the porous ceramic structure shown in FIGS. 8 and 9, the cavities in the walls of the cylindrical cell units are not limited to a particular shape, but it is preferred to form the cavities continuously along the cell walls from one end of the cell walls to a position close to the other end face as shown in FIG. 9. In this instance, the cavities are preferred to have a width ranging from 1/10 to ½ of the thickness of the cell wall and a depth ranging from 9/10 to 3/10 of the height of the cell walls.

The ceramic roll core with such cavities can be produced, for example, by depositing the ceramic slurry on a core material of a shape similar to the roll core shown in FIG. 1, drying the deposited ceramic slurry, removing the ceramic slurry on one axial end until the core material is exposed, and sintering the shaped green structure. The core material is removed by carbonization in the sintering stage, leaving cavities in the sintered ceramic structure. It is also possible to remove the ceramic on one axial end of the core roll and to open the cavities after sintering and carbonizing the core material. However, this method is not recommended since there are possibilities of fracturing the ceramic roll core.

For use as a gas permeable heat insulator, the above-described porous ceramic structure may be disposed in an arbitrary way, but it is preferable to position the open ends of the cavities on the upstream side of a fluid, namely, on the side of higher temperature. When the open ends of the cavities which easily undergo thermal deformations are located on the high temperature side, the thermal stress resulting from the temperature difference between the upstream and downstream sides is suitably dispersed to prevent fracturing of the roll core.

Figure 10:
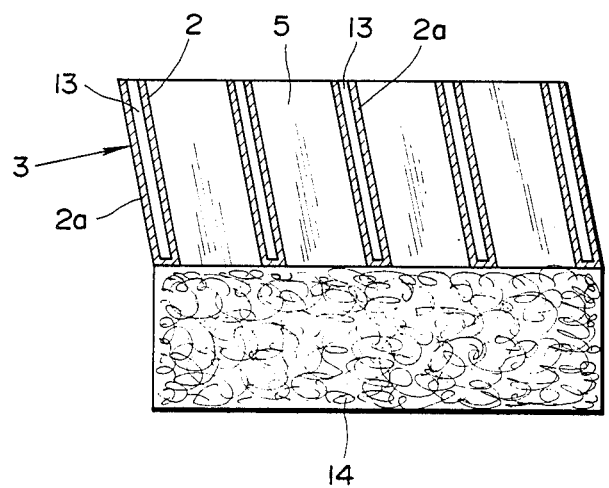
FIG. 10 is a diagrammatic longitudinal section of a further embodiment of the invention.

Referring to FIG. 10, there is shown a further embodiment of the invention, which is provided with a porous ceramic body 14 at one end of a roll core or an assembly of roll cores with cavities which are opened at the other end as in the embodiment of FIGS. 8 and 9. When using this porous ceramic structure as a gas permeable heat insulator, the roll core or roll core assembly is located on the upstream side of higher temperature, and the porous ceramic body is located on the downstream side of lower temperature. Also in this case, the thermal stress which is caused by temperature differences in the roll core is reduced by the provision of the cavities in the walls of the cylindrical cell units of the roll core on the upstream side and which are open at one axial end (on the upstream side). The above-described double layer construction prevents the thermal stress from being transmitted directly from the roll core on the upstream side to the ceramic body on the downstream side, thereby lowering the thermal stress which might lead to fracturing of the porous ceramic structure. employed the ceramic foam or ceramic needles as described hereinbefore.

Although the invention has been described and shown by way of preferred embodiments, it is to be understood that the invention is not restricted thereto and various alterations and modifications can be added thereto by those skill in the art without departing from the sphere of the invention defined by the appended claims.

What is claimed is:

1. A gas permeable heat insulator capable of being fitted in an exhaust port or exhaust gas passage of a furnace for the purpose heat energy of exhaust gases by heat exchange as the gases pass through the gas permeable heat insulator of shielding the furnace from radiation cooling and collecting the comprising a ceramic roll core or an assembly of ceramic roll cores each comprising:
consecutively aligned pairs of inclined cylindrical cell units of oblique figure "8" shape, each cylindrical cell unit having a width of 5-30 mm, a height of 10-100 mm and an angle of inclination of 20-70 degrees.

2. The porous ceramic structure of claim 1, wherein said roll core is provided with openings in the walls of the respective cylindrical cell units, communicating adjacent cylindrical cell units with each other through said openings.

3. The porous ceramic structure of claim 1, comprising two or more of said roll cores or roll core assemblies in a stacked form.

4. The porous ceramic structure of claim 1, wherein said roll core or roll core assembly is sandwiched between outer porous ceramic bodies having three-dimensional interconnected open cells to let a fluiud hit against the interconnected open cells; repeatedly as said fluid flows therethrough.

5. The porous ceramic structure of claim 4, wherein the porous ceramic body of at least one of said outer layers is of ceramic foam having a three-dimensional netlike structure with intercommunicating internal void spaces.

6. The porous ceramic structure of claim 4, wherein the porous ceramic body of at least one of said outer layers is of a cermaic needle structure consisting of overlappingly connected ceramic needles.

7. The porous ceramic structure of claim 1, wherein said roll core is provided with cavities in the walls of said cylindrical cell units, said cavities being opened at one axial end of said roll core.

8. The porous ceramic structure of claim 1, wherein each cylindrical cell unit has a width of 7-18 mm; a height of 15-30 mm and an angle of inclination of 30-65 degrees.

9. The porous ceramic structure of claim 3, wherein the stacked roll cores or roll core assemblies are staggered.

10. The porous ceramic structure of claim 1, wherein the ceramic roll cores are manufactured by drying and sintering ceramic slurry which is deposited on a substrate roll core or an assembly of a number of bonded substrate roll cores, which is in turn formed by alternately folding an elongated strip of paper or plastic sheet in such a manner as to form a figure "8" consecutively in an oblique fashion and cutting the opposite ends of the cylindrical cell units obliquely.

11. A method of shielding a furnace from radiation comprising:
fitting a gas permeable heat insulator in an exhaust port or exhaust gas passage of the furnace so that the exhaust gas will impinge on the walls of the heat insulator, said gas permeable heat insulator being made of a porous ceramic structure comprising ceramic roll core or an assembly of ceramic roll cores each comprising consecutively aligned pairs of inclined cylindrical cell units of oblique figure "8" shape, each cylindrical cell unit having a width of 5-30 mm, a height of 10-100 mm and an angle of inclination of 20-70 degrees.

12. The method of claim 11, wherein said roll core is provided with openings in the walls of the respective cylindrical cell units, communicating adjacent cylindrical cell units with each other through said openings.

13. The method of claim 11, wherein said porous ceramic structure comprises two or more of said roll cores or roll core assemblies in a stacked form.

14. The method of claim 11, wherein said roll core or roll core assembly is sandwiched between outer porous ceramic bodies having three-dimensional interconnected open cells to let a fluid hit against the interconnected open cells as said fluid flows therethrough.

15. The method of claim 14, wherein the porous ceramic body of at least one of said outer layers comprises ceramic foam having a three-dimensional netlike structure with intercommunicating internal void spaces.

16. The method of claim 14, wherein the porous ceramic body of at least one of said outer layers comprises a ceramic needle structure comprising overlapping connected ceramic needles.

17. The method of claim 11, wherein said roll core is provided with cavities in the walls of said cylindrical cell units, said cavities being opened at one axial end of said roll core.

18. The porous ceramic structure of claim 11, wherein each cylindrical cell unit has a width of 7 to 18 mm, a height of 15 to 30 mm, and an angle of inclination of 30 to 65 degrees.

19. The method of claim 13, wherein the stacked roll cores or roll core assemblies are staggered.

20. The method of claim 11, wherein the ceramic roll cores are manufactured by drying and sintering ceramic slurry which is deposited on a substrate roll core or an assembly of a number of bonded substrate roll cores, which is in turn formed by alternately folding an elongated strip of paper or plastic sheet in such a manner as to form a figure "8" consecutively in an oblique fashion and cutting the opposite ends of the cylindrical cell units obliquely.

* * * * *